(12) United States Patent
Myers

(10) Patent No.: US 6,581,262 B1
(45) Date of Patent: Jun. 24, 2003

(54) INSTALLATION TOOL FOR IRRIGATION EMITTER BARBS

(76) Inventor: Michael Myers, 451 Crestdale La., #37, Las Vegas, NV (US) 89144

( * ) Notice: Subject to any disclaimer, the term of this patent is extended or adjusted under 35 U.S.C. 154(b) by 0 days.

(21) Appl. No.: 10/282,508

(22) Filed: Oct. 29, 2002

(65) Prior Publication Data

(65)

(51) Int. Cl.⁷ .................................. B23P 19/02
(52) U.S. Cl. ........................ 29/268; 29/267; 29/270
(58) Field of Search ................... 29/268, 242, 242.243, 29/270, 283.5, 432, 267; 81/426, 426.5

(56) References Cited

U.S. PATENT DOCUMENTS

| | | |
|---|---|---|
| 1,464,807 A | 8/1923 | Clark |
| 3,698,419 A | 10/1972 | Tura |
| 4,222,985 A | 9/1980 | Greenleaf |
| 5,117,846 A | 1/1983 | Bryant |
| 4,392,616 A | 7/1983 | Olson |
| 4,497,321 A | 2/1985 | Fearing et al. |
| 4,522,339 A | 6/1985 | Costa |
| 5,398,718 A | 3/1995 | Roinick, Sr. |
| 5,722,142 A * | 3/1998 | Myers ........................ 29/268 |
| 5,893,201 A * | 4/1999 | Myers ........................ 29/268 |

* cited by examiner

Primary Examiner—Lee D. Wilson
(74) Attorney, Agent, or Firm—Frank J. McGue

(57) ABSTRACT

A tool installs barb emitters in irrigation tubing. The tool has a cradle which receives irrigation tubing and a punch mounted opposite the cradle. The punch has a first cylinder and a second cylinder telescopically received within the first cylinder. The first cylinder has a cap at the upper end and an annular ring extending inwardly from to partially occlude the lower end. The second cylinder includes a second cap at the upper end which slidably engages the first cylinder and is resiliently urged by a spring against the annular ring. The cap has a punch holder extending downwardly therefrom. A needle has a sharp tip extending downwardly from the punch holder through the second cap to a point within the second cylinder when the spring is fully extended and beyond the second cylinder when the spring is fully compressed.

3 Claims, 2 Drawing Sheets

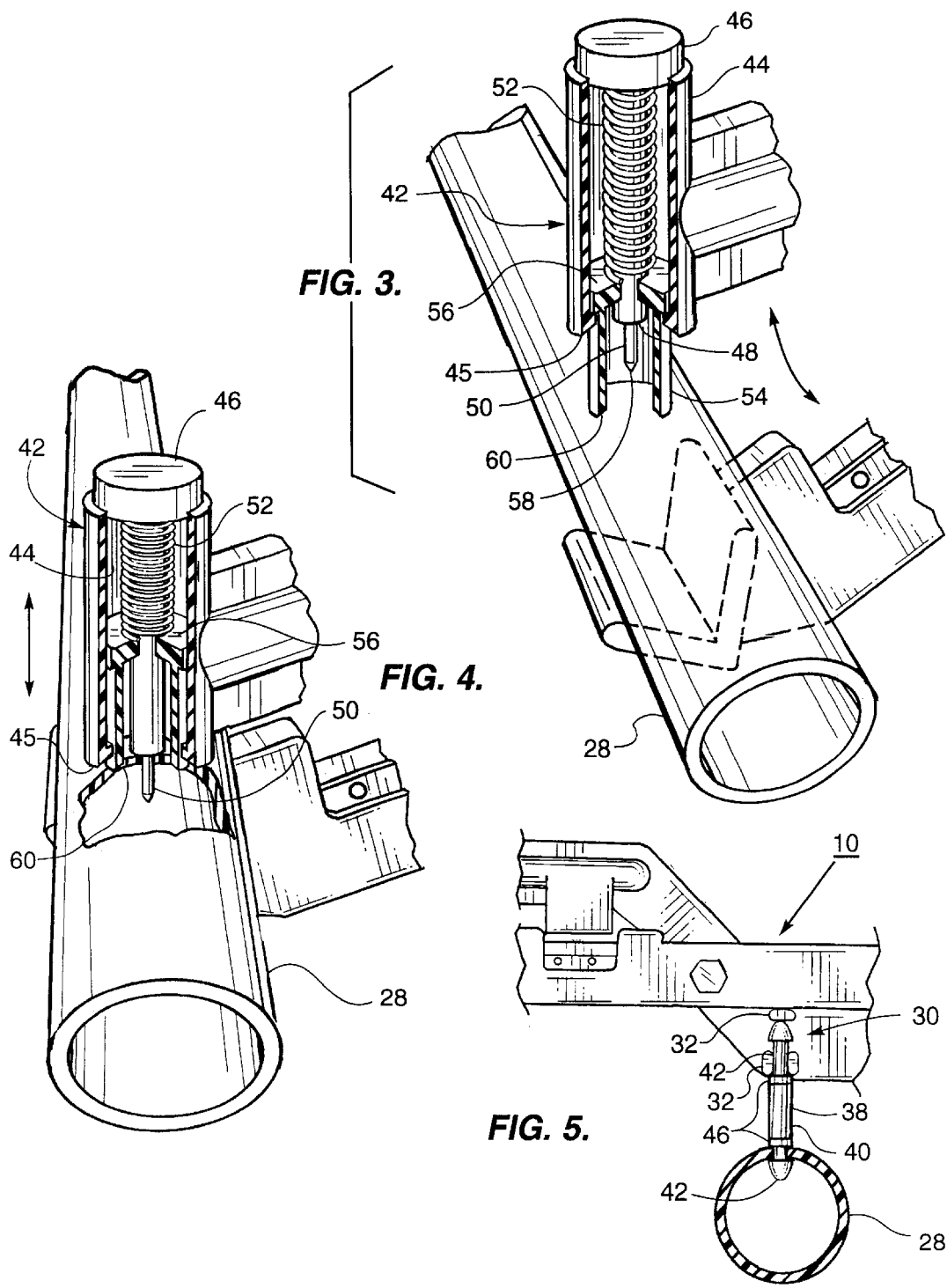

INSTALLATION TOOL FOR IRRIGATION EMITTER BARBS

TECHNICAL FIELD

This invention relates to the field of irrigation tools, and, more particularly, to a tool for installing irrigation emitter barbs in irrigation tubing.

BACKGROUND OF THE INVENTION

It is common to use plastic tubing to distribute water to various locations for irrigation purposes. In such use, hollow irrigation emitter barbs are mounted as desired on the plastic tubing. Such barbs are hollow allowing the water contained within the tubing to be distributed, or emitted, as desired. Small diameter flexible tubing can be mounted on the barbs to place the water where desired.

Irrigation emitter barbs are generally symmetrical and are provided with sharp piercing points at both ends to penetrate the wall of the tubing. Further, enlarged heads are provided to impede the withdrawal of the barb from the tubing. While irrigation emitter barbs can be installed by hand, the sharp piercing points can cause injury to workers. In fact, the present invention was inspired after applicant viewed the bloodied hands of workers installing a large number of such irrigation emitter barbs.

Various types of installation tools are well known in art. For example, punch tools have been employed which punch the hole in the tubing for the subsequent placement of irrigation emitter barbs. However, installation still requires handling of the sharp piercing points by the installer.

U.S. Pat. No. 4,222,985 entitled "Laboratory Tool" which issued on Sep. 16, 1980 to Greenleaf discloses a ferrule removal tool which utilizes a solid post and slot combination which engages the end, not the periphery, of a tube to remove a ferrule therefrom.

U.S. Pat. No. 4,497,321 entitled "Ear Tag Applicators" which issued on Feb. 5, 1985 to Fearing et al. shows the use of a tapered pin to engage the interior recess of a hard conical spike portion of a two piece animal tag. The spike rests upon a platform of the device.

U.S. Pat. No. 4,522,339 entitled IRRIGATION FITTING WITH INSTALLATION BARB AND ASSOCIATED INSTALLATION BARB TOOL which issued on Jun. 11, 1985 to Costa discloses an irrigation fitting barb and associated barb insertion tool. However, the Costa tool requires use of the specific Costa fitting to properly function and thus does not function with standard irrigation emitter barbs.

U.S. Pat. No. 5,177,846 entitled INSERTION TOOL which issued on Jan. 12, 1983 to Bryant discloses a hand held tool for inserting fittings or flow control devices into an irrigation line.

U.S. Pat. No. 4,392,616 entitled SELF-PERFORATING DRIP IRRIGATION DEVICE which issued on Jul. 12, 1983 to Olson shows, in FIGS. 10 and 11, a tool for inserting barbs into an irrigation line.

U.S. Pat. No. 1,464,807 entitled DENTAL INSTRUMENT which issued on Aug. 14, 1923 to Clark shows a plier type tool having a punch at the far end and an anvil portion which cooperates with a recess.

U.S. Pat. No. 3,698,419 entitled DEVICES FOR PIERCING TUBES IN CLOSED PRESSURE SYSTEMS which issued on Oct. 17, 1972 to Tura and U.S. Pat. No. 5,398,718 entitled TAP LINE PLIERS which issued on Mar. 21, 1995 to Roinick Sr. are representative of several patents showing plier type tools having a lower jaw which supports a tube and an upper jaw which has a punch.

U.S. Pat. Nos. 5,722,142 and 5,893,201 both entitled INSTALLATION TOOL FOR IRRIGATION EMITTER BARBS which issued on Mar. 3, 1998 and Apr. 13, 1999, respectively, to the present inventor provide a tool for using the irrigation emitter barbs themselves as a punch.

None of the known prior art disclose the combination set forth herein.

SUMMARY OF THE INVENTION

It is an object of this invention to provide a tool for installing irrigation emitter barbs in irrigation tubing.

It is a further object of this invention to provide a tool for installing irrigation emitter barbs in irrigation tubing in two steps.

It is still another object of this invention to provide a tool for safely installing irrigation emitter barbs in irrigation tubing.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 3 is a partial cross sectional close up view of a cradle and punch of the device depicted in FIG. 1 in an open position;

FIG. 4 is a partial cross sectional close up view of the cradle and punch of the device depicted in FIG. 3 is a closed position; and FIG. 5 partial cross sectional close up side view of an inserter of the device of FIG. 1 inserting an irrigation emitter barb in irrigation tubing.

DESCRIPTION OF THE PREFERRED EMBODIMENT

Figure 1:
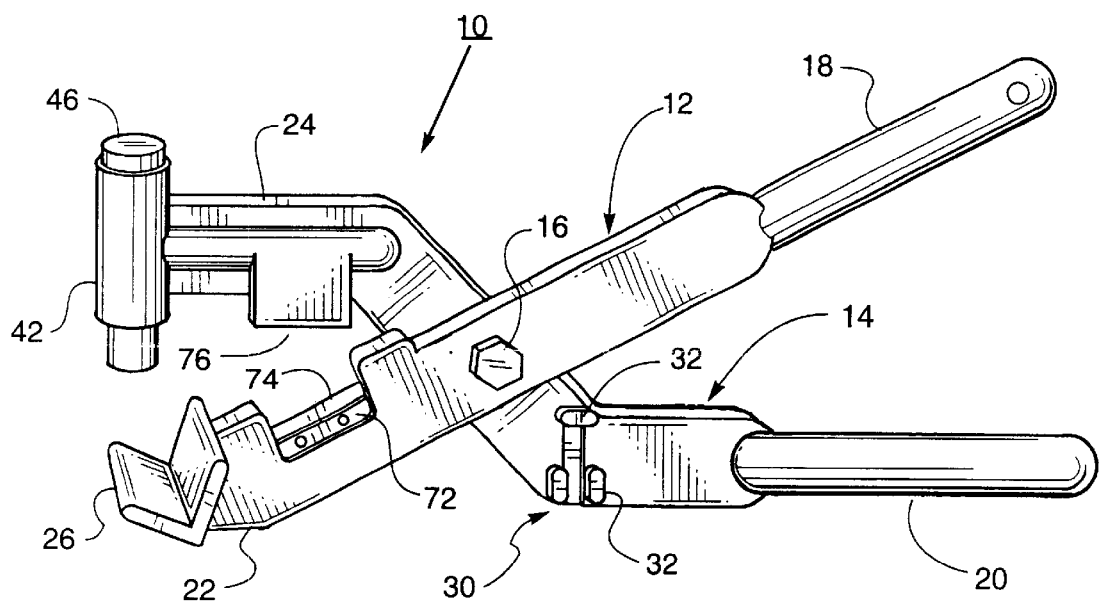
FIG. 1 is a perspective view of one side of one embodiment of the present invention.
Figure 2:
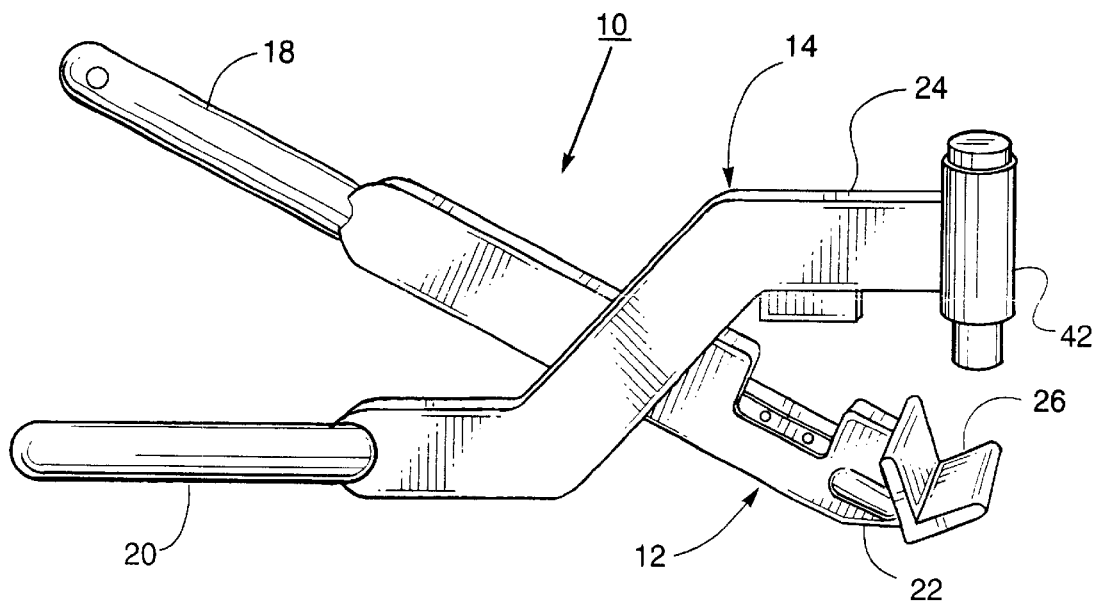
FIG. 2 is a perspective view of the other side of the embodiment of FIG. 1.

Referring more particularly to the drawings by characters of reference, FIGS. 1–5 disclose one embodiment of an irrigation tool 10. Irrigation tool 10 comprises a cradle member 12 and a punch member 14. Cradle member 12 and punch member 14 are arranged in crossed relation and pivotally connected intermediate their ends at pivot 16. The portions of cradle member 12 and barb holder member 14 extending rearwardly from pivot 16 constitute cradle handle 18 and punch handle 20, respectively. The portions of cradle member 12 and punch member 14 extending forwardly from pivot 16 constitute cradle jaw 22 and punch jaw 24, respectively.

It will be understood by those skilled in the art that other plier type arrangements would be applicable to the present invention. For example, a double pivot vice grip plier arrangement would also be suitable for use in the present invention.

Mounted at end of cradle jaw 22 is a cradle 26 which is an upwardly opening V-shape and elongated widthwise for receiving a peripheral portion of irrigation tubing 28.

As best seen in FIGS. 3 and 4, in the preferred embodiment, a punch 42 is mounted at the distal end of punch jaw 24 which comprises a hollow first cylinder 44 having a cap 46 at the upper end of cylinder 44. At the open, lower end of cylinder 44, an annular ring 45 extends inwardly therefrom to partially occlude the lower, open end of cylinder 44.

A second hollow cylinder 54 is telescopically received within first hollow cylinder 44. Second hollow cylinder 54 includes a second cap 56 at the upper end of said second hollow cylinder 54 to slidably engage the interior sidewall of first hollow cylinder 44. Second cap 56 in combination with annular ring 45 prevents complete separation of cylinders 54 and 44 from by sliding said second hollow cylinder 54 from the open end of first hollow cylinder 44.

Cap 46 has a punch holder 48 extending downwardly therefrom. A spring 52 is wrapped concentrically around punch holder 48 and resiliently urges second cap 56 against annular ring 45, thereby keeping second hollow cylinder 54 at a maximum extension from first hollow cylinder 44 as best seen in FIG. 3. A needle 50 having a sharp tip 58 extends downwardly from punch holder 48 to extend through second cap 56 to a point beyond first hollow cylinder 44 but within second hollow cylinder when at the spring is at its full permitted extension. In the maximum extension configuration, sharp tip 58 of needle 50 is completely contained within second hollow cylinder 54.

To use, irrigation tubing 28 is laid widthwise in cradle 26 as best seen in FIGS. 3 and 4. Handles 18 and 20 are pushed together thereby pushing punch 30 downwardly into cradle 26 as best seen in FIG. 4. An open end 60 of second hollow cylinder 54 first engages the periphery of irrigation tubing 28 which forces second hollow cylinder 54 to retract upwardly into first hollow cylinder 44 with spring 52 compressing. Sharp point 58 of needle 50 then extends beyond second hollow cylinder 54 and engages the periphery of irrigation tubing 28, and with additional force, punches a hole therethrough as best seen in FIG. 4.

After a hole is punched, punch 30 is withdrawn. As punch 30 moves away, open end 60 again contacts the periphery of irrigation tubing 28. Spring 52 forces second hollow cylinder downwardly to cover needle 50 whereby needle 50 is forced from said periphery of irrigation tubing 28. The forced release of needle 50 from irrigation tubing 28 is key to the invention in that it prevents said needle from hanging up on said tubing, a defect of the prior art.

Inserted barb emitter 38 can be left as is or small extension tubing 28 can be inserted over upper enlarged head 62 to direct water as desired.

Mounted on punch handle 20 proximate to pivot 16 is an inserter 30. Inserter 30 comprises three studs 32 which are adapted to engage an irrigation emitter 38.

As best seen in FIG. 5, an emitter barb 38 generally comprises a hollow cylinder 40 having two enlarged heads 62 having a larger diameter than cylinder 40 at either end thereof. Each enlarged head 62 includes a rounded point 64 which allow barbs 38 to pierce the periphery of irrigation tubing 28. Once enlarged head 62 extends completely into irrigation tubing 28, its larger diameter impedes its withdrawal from irrigation tubing 28.

Further, emitter barb 38 includes two annular shoulder disks 46. Shoulder disks 46 in cooperation with enlarged heads 62 hold the wall of irrigation tubing 28 therebetween when emitter barb 38 is properly inserted therein. As is well known in the art, emitter barb 38 and irrigation tubing 28 are manufactured of plastics.

As best seen in FIG. 5, one stud 32 engages one rounded point 64 of head 62 while the two remaining studs 32 are positioned to engage opposite sides of cylinder 40 between head 62 and annular shoulder disk 46 proximate to the one rounded point 64.

The user inserts the lower enlarged head 62 of emitter barb 38 into the hole just punched through the periphery of irrigation tubing 28 using device 10 as leverage until said periphery is captured between the lower shoulder disk 46 and said lower enlarged end 62. Once properly inserted, a lateral movement of device 10 parallel to irrigation tubing 28 in a direction opposite the side of device 10 having inserter 30 thereon releases emitter barb 39.

As an added convenience, tool 10 can include a notch 72 in cradle jaw 22 which includes a knife 74. A push 76 on punch jaw 24 pushes any irrigation tubing 28 within notch 72 onto knife 74 to cut such irrigation tubing 28 to any desired lengths.

Although only certain embodiments have been illustrated and described, it will be apparent to those skilled in the art that various changes and modifications may be made therein without departing from the spirit of the invention or from the scope of the appended claims.

What is claimed is:

1. A tool for installing irrigation barb emitters in irrigation tubing, the tool comprising:

a cradle member having a cradle handle and a cradle jaw on opposing ends thereof, and a punch member having a punch handle and a punch jaw on opposing ends thereof, the cradle member and the punch member being arranged in crossed relation and connected intermediate the opposing ends at a pivot such that the cradle handle opposes the punch handle and the cradle jaw opposes the punch jaw, a cradle mounted on the cradle jaw suitable for receiving a peripheral portion of an irrigation tubing; and a punch mounted at the distal end of the punch jaw having a hollow first cylinder and a low second cylinder telescopically received within the hollow first cylinder, the hollow first cylinder having a cap at the upper end thereof and an annular ring extending inwardly from to partially occlude the lower end thereof, the second hollow cylinder including a second cap at the upper end thereof adapted to slidably engage the interior of the first hollow cylinder, the second cap in combination with the annular ring preventing separation of the first hollow cylinder and the second hollow cylinder at the open end of the first hollow cylinder, the cap having a punch holder extending downwardly therefrom, a spring being wrapped concentrically around the punch holder which resiliently urges the second cap against the annular ring, a needle having a sharp tip extending downwardly from the punch holder through the second cap to a point beyond the first hollow cylinder, the needle being within the second hollow cylinder when the spring is fully extended, the needle extending beyond the second hollow cylinder when the spring is fully compressed.

2. The tool as set forth in claim 1 wherein the cradle is a V-shape with an opening facing the barb holder jaw and which extends laterally from the cradle jaw for receiving an irrigation tubing.

3. The tool as set forth in claim 1 further comprising a notch having a knife in one of the cradle jaw or the barb holder jaw which mates with a corresponding push in the other of the cradle jaw or the barb holder jaw to cut such small extension tubing to desired lengths.

* * * * *